United States Patent
Valaguru

(10) Patent No.: US 10,921,986 B2
(45) Date of Patent: *Feb. 16, 2021

(54) EFFICIENT SPACE MANAGEMENT FOR HIGH PERFORMANCE WRITABLE SNAPSHOTS

(71) Applicant: Oracle International Corporation, Redwood Shores, CA (US)

(72) Inventor: Sridhar Valaguru, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/412,267

(22) Filed: May 14, 2019

(65) Prior Publication Data

US 2020/0363960 A1 Nov. 19, 2020

(51) Int. Cl.
*G06F 3/06* (2006.01)
*G06F 16/11* (2019.01)

(52) U.S. Cl.
CPC ............ *G06F 3/0608* (2013.01); *G06F 3/064* (2013.01); *G06F 3/0631* (2013.01); *G06F 3/0674* (2013.01); *G06F 16/122* (2019.01)

(58) Field of Classification Search
CPC .... G06F 16/11; G06F 16/122; G06F 2201/84; G06F 3/0608; G06F 3/0631; G06F 3/064; G06F 3/0674

See application file for complete search history.

(56) References Cited

U.S. PATENT DOCUMENTS

| 7,100,089 | B1 | 8/2006 | Phelps |
| 7,379,954 | B2 | 5/2008 | Shoens |
| 7,756,844 | B2 | 7/2010 | Shoens et al. |
| 7,836,029 | B2 | 11/2010 | Shoens |
| 7,991,791 | B1 | 8/2011 | Chen et al. |

(Continued)

OTHER PUBLICATIONS

A. Brinkmann, S. Effert, M. Heidebuer and M. Vodisek, "Realizing Multilevel Snapshots in Dynamically Changing Virtualized Storage Environments," International Conference on Networking, International Conference on Systems and International Conference on Mobile Communications and Learning Technologies (Year: 2006).*

(Continued)

*Primary Examiner* — Khoa D Doan
(74) *Attorney, Agent, or Firm* — Invoke

(57) ABSTRACT

Techniques for providing efficient space management in writable snapshots are disclosed. The techniques include dividing available storage in a filesystem into one or more contiguous allocation unit (AU) chunks. Each AU chunk includes a set of contiguous fixed-size AUs, wherein each AU includes a series of contiguous fixed-size blocks. Each AU chunk also includes a set of contiguous AU mappings, wherein each AU mapping represents a different AU. The techniques also include storing, in a first AU mapping, a first snapshot identifier for a snapshot of the filesystem to indicate allocation of a first AU represented by the first AU mapping to the snapshot. The techniques further include allocating a first block in the first AU to the snapshot by incrementing, in the first AU mapping, a reference count that tracks a number of blocks in the first AU that are allocated to the snapshot.

20 Claims, 6 Drawing Sheets

(56) References Cited

U.S. PATENT DOCUMENTS

| | | |
|---|---|---|
| 8,533,157 B2 | 9/2013 | Honami et al. |
| 8,533,410 B1 | 9/2013 | Corbett et al. |
| 8,806,154 B1 | 8/2014 | Gupta et al. |
| 8,954,383 B1 | 2/2015 | Vempati et al. |
| 9,552,242 B1* | 1/2017 | Leshinsky ............ G06F 11/0709 |
| 9,753,813 B1* | 9/2017 | Fan ......................... G06F 3/065 |
| 10,083,196 B2 | 9/2018 | Schrock et al. |
| 10,496,599 B1* | 12/2019 | Haravu ................ G06F 11/1464 |
| 2003/0212752 A1 | 11/2003 | Thunquest et al. |
| 2004/0083345 A1 | 4/2004 | Kim et al. |
| 2005/0021565 A1 | 1/2005 | Kapoor et al. |
| 2005/0071379 A1 | 3/2005 | Kekre et al. |
| 2005/0138312 A1 | 6/2005 | Kubo et al. |
| 2005/0163014 A1 | 7/2005 | Soeda |
| 2005/0182797 A1 | 8/2005 | Adkins et al. |
| 2006/0053139 A1 | 3/2006 | Marzinski et al. |
| 2006/0129779 A1 | 6/2006 | Cannon et al. |
| 2007/0055710 A1 | 3/2007 | Malkin |
| 2007/0162716 A1 | 7/2007 | Yagisawa et al. |
| 2007/0192560 A1 | 8/2007 | Furuhashi |
| 2008/0140963 A1 | 6/2008 | Thomason et al. |
| 2008/0288546 A1 | 11/2008 | Adkins et al. |
| 2009/0300315 A1 | 12/2009 | Agombar et al. |
| 2010/0049754 A1 | 2/2010 | Takaoka et al. |
| 2010/0106933 A1 | 4/2010 | Kamila et al. |
| 2010/0131727 A1 | 5/2010 | Eguchi et al. |
| 2011/0107052 A1* | 5/2011 | Narayanasamy ....... G06F 3/064 711/171 |
| 2011/0258391 A1 | 10/2011 | Atkisson et al. |
| 2011/0283075 A1 | 11/2011 | Jess et al. |
| 2011/0314246 A1 | 12/2011 | Miller et al. |
| 2012/0096217 A1* | 4/2012 | Son ....................... G06F 3/0616 711/103 |
| 2012/0311284 A1 | 12/2012 | Nemoto et al. |
| 2013/0054530 A1 | 2/2013 | Baker et al. |
| 2013/0103644 A1 | 4/2013 | Shoens |
| 2015/0161012 A1 | 6/2015 | Meier et al. |
| 2015/0370641 A1 | 12/2015 | Susairaj et al. |
| 2016/0098413 A1 | 4/2016 | Stephenson et al. |
| 2016/0110268 A1 | 4/2016 | Sekiguchi et al. |
| 2016/0110408 A1 | 4/2016 | Madhavarapu et al. |
| 2016/0283148 A1 | 9/2016 | Nakagawa |
| 2016/0314046 A1 | 10/2016 | Kumarasamy |
| 2016/0350329 A1 | 12/2016 | Resch et al. |
| 2017/0031771 A1 | 2/2017 | Binford et al. |
| 2017/0031772 A1 | 2/2017 | Subramanian et al. |
| 2017/0123706 A1 | 5/2017 | Algie et al. |
| 2017/0199679 A1* | 7/2017 | Patocka .............. G06F 12/0877 |
| 2017/0286286 A1* | 10/2017 | Szubbocsev .......... G06F 3/0688 |
| 2018/0046556 A1* | 2/2018 | Marathe ................ G06F 3/0688 |
| 2018/0137014 A1 | 5/2018 | Li et al. |
| 2018/0260119 A1 | 9/2018 | Atia et al. |

OTHER PUBLICATIONS

Brinkmann, Realizing Multilevel Snapshots in Dynamically Changing Virtualized Storage Environments, Conference on Mobile Communications and Learning Technologies (Year: 2006).

Junwei Zhang et al: "A Storage Slab Allocator for Disk Storage Management in File System", Networking, Architecture, and Storage, 2009. NAS 2009. IEEE International Conference on, IEEE, Piscataway, NJ, USA, Jul. 9, 2009, pp. 295-302. XP031505428, ISBN: 978-0-7695-3741-2.

* cited by examiner

EFFICIENT SPACE MANAGEMENT FOR HIGH PERFORMANCE WRITABLE SNAPSHOTS

RELATED APPLICATION

The subject matter of this application is related to the subject matter in a co-pending non-provisional application entitled "High-Performance Writable Snapshots in Data Storage Systems," having Ser. No. 15/639,757, filed 30 Jun. 2017, which is hereby incorporated by reference.

TECHNICAL FIELD

The present disclosure relates to snapshotting of data. In particular, the present disclosure relates to efficient space management for high performance writable snapshots.

BACKGROUND

Snapshots of filesystems, volumes, databases, and/or other data storage systems may be created to facilitate backing up and restoration of stored data. At the same time, writable versions of snapshots may be used to modify data in the snapshots during testing of the data (e.g., running a number of tests on a copy of a production database) and/or per-user customization of the data (e.g., saving of user data with a base virtual machine disk image used by multiple users).

If a snapshot is writable, modifications to data in the snapshot may be made directly to storage regions allocated to the snapshot. On the other hand, modifications to data in a read-only snapshot may be stored in a separate writable snapshot using a copy-on-write (COW) operation that copies the data to locations allocated to the writable snapshot before the data is modified at the locations. The storage system may thus be required to track dependencies of the snapshots on data in other snapshots to determine when space occupied by the data can be freed. At the same time, read and/or write operations performed to manage such dependencies may involve random input/output (I/O) and/or overhead that interferes with the performance of normal reading and writing of data in the snapshots.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. EFFICIENT SPACE MANAGEMENT FOR HIGH PERFORMANCE WRITABLE SNAPSHOTS
4. EXAMPLE EMBODIMENT
5. STORING SNAPSHOTS IN A STORAGE MANAGEMENT SYSTEM
6. EXECUTING WRITES TO A SNAPSHOTTED DATA SET
7. DELETING SNAPSHOTS IN A STORAGE MANAGEMENT SYSTEM
8. COMPUTER NETWORKS AND CLOUD NETWORKS
9. MISCELLANEOUS; EXTENSIONS
10. HARDWARE OVERVIEW

1. General Overview

A storage management system manages read-only and writable snapshots of filesystems, volumes, databases, and/or other data storage systems. The storage management system uses a fixed-size, repeating layout of metadata and data to manage allocation of blocks to snapshots, writes to the blocks by the snapshots, deletions of blocks by the snapshots, and/or deletion of snapshots. The data includes "allocation units" (AUs) of contiguous blocks that are assigned or allocated to individual snapshots. The metadata includes mappings of the AUs to identifiers of snapshots to which the AUs are assigned and reference counts that track the number of blocks that have been allocated or freed in each AU. The metadata also specifies the use of a subset of AUs in tracking blocks that have been freed by writable snapshots (e.g., during copy-on-write (COW) operations that copy the blocks from read-only snapshots to new locations for subsequent modification by the writable snapshots).

To reduce overhead associated with random input/output (I/O) and/or reading and writing of striped data, the storage management system stores the metadata in a compact format, which allows most or all of the metadata to be cached or maintained in memory. The metadata is also stored in one or more stripes, which allows writes to the metadata to be sequential instead of random and/or reduces the use of read-modified-writes to the underlying storage. Some writes can also be batched and/or delayed to combine several modifications to the same data structure into a single disk I/O. Consequently, the storage management system provides improved performance and throughput over conventional storage management designs that require large amounts of I/O and/or random I/O to maintain metadata that tracks usage of storage by snapshots.

One or more embodiments described in this Specification and/or recited in the claims may not be included in this General Overview section.

2. Architectural Overview

Figure 1:
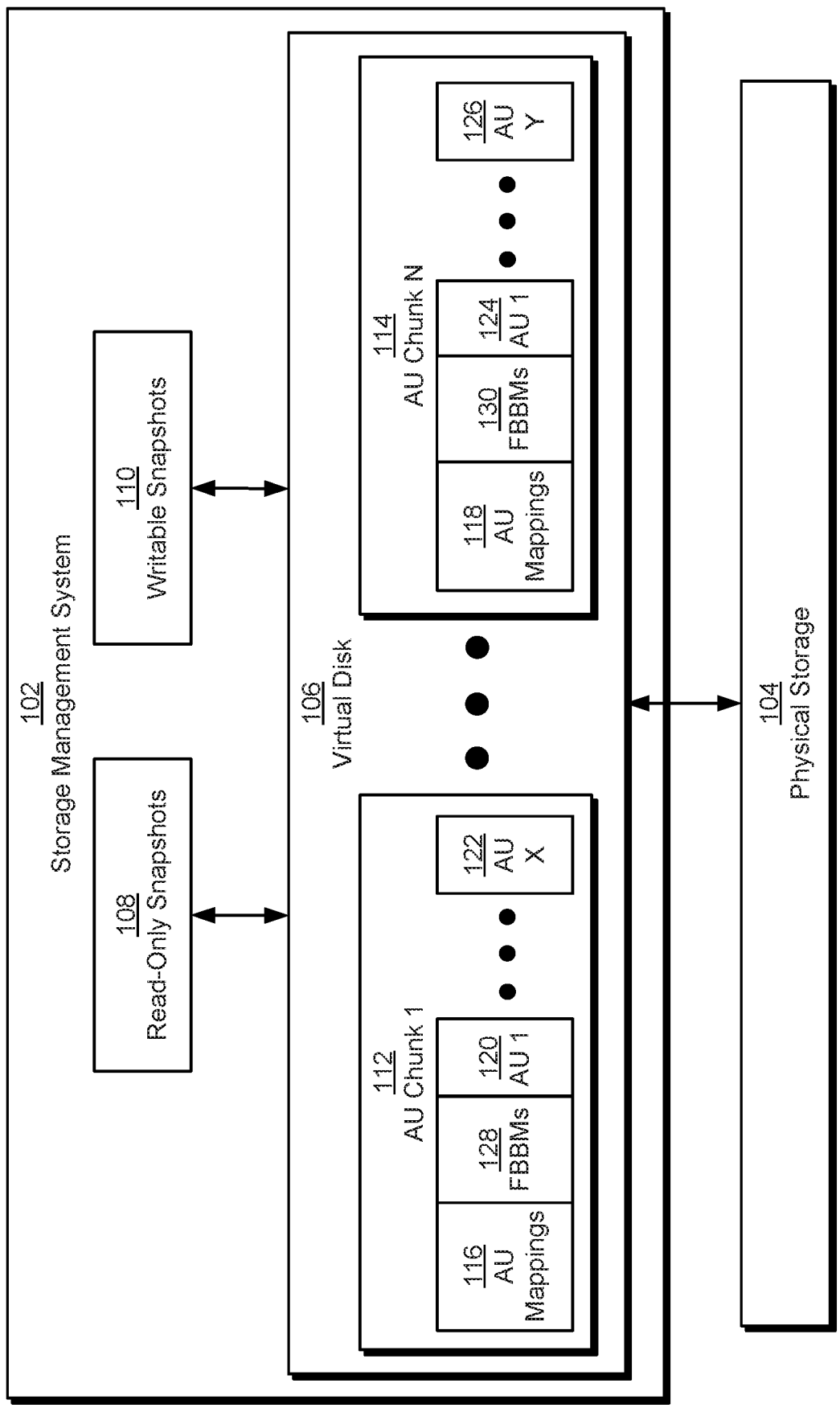
FIG. 1 illustrates a system in accordance with one or more embodiments.

FIG. 1 illustrates a system in accordance with one or more embodiments. As illustrated in FIG. 1, system 100 includes a storage management system 102 that stores a data set on physical storage 104. Physical storage 104 includes one or more hard disk drives (HDDs), solid-state drives (SSDs), optical drives, floppy disks, magnetic tape storage, Flash memory, cloud or network storage, and/or other types of physical components or devices for recording and retaining digital data. In turn, the data set stored on physical storage 104 may include audio, video, multimedia, documents, databases, files, directories, filesystems, applications, operating systems, virtual machines, and/or other types of digital data used or manipulated by computer systems or electronic devices.

In some embodiments, storage management system 102 provides a layer of abstraction over physical storage 104 by presenting multiple physical storage devices as a single virtual disk 106 and/or multiple virtual disks. For example, storage management system 102 may combine five 100 GB HDDs or SSDs into a single virtual disk 106 with a capacity of 500 GB. In another example, storage management system 102 may allocate the same or different amounts of space from the five 100 GB HDDs or SSDs to form a single 400 GB virtual disk 106. In a third example, storage management system 102 may form multiple virtual disks of the same size or different sizes from one or more physical storage devices. In a fourth example, storage management system 102 may utilize Redundant Array of Independent Disks (RAID) technology to perform striping, mirroring, and/or parity of data across multiple HDDs or SSDs in physical storage 104.

Storage management system 102 additionally supports snapshotting of the data set stored on virtual disk 106. In particular, storage management system 102 includes functionality to store both read-only snapshots 108 and writable snapshots 110 of the data on virtual disk 106. For example, storage management system 102 may create each snapshot as the state of the data set at a given point in time. The snapshots may form a chain or tree of inheritance, in which each snapshot stores changes made to the data set over a previous snapshot as a set of differentials. Within the chain or tree, the latest snapshots in a given branch may be writable, while all other snapshots may be read-only (to preserve the use of differential snapshotting by the system). Thus, modifications to a given read-only snapshot may be stored by creating a writable version of the snapshot and storing the modifications in the writable version. In turn, the writable version may support testing of the data set, creation of a user-specific instance of a virtual machine from a shared or common virtual machine disk image, and/or other use cases related to copying and modifying data sets. At the same time, automatic, periodic and/or regular snapshotting of the data set may facilitate restoration of data from previous snapshots in the event of data corruption, accidental data deletion, exploits, and/or other problems with the data set.

Read-only snapshots 108 and writable snapshots 110 are assigned to unique snapshot identifiers, such as integers that are bounded by a maximum value that restricts storage of the snapshot identifiers to a certain number of bytes. Creation of new child snapshots from previous parent snapshots and/or other inheritance-based dependencies among the snapshots may be tracked by storing and/or linking the snapshot identifiers using data types or structures such as linked lists, pointers, references, and/or trees. When a new child snapshot is created from an older parent snapshot, a snapshot identifier is assigned to the child snapshot and used to reference the snapshot identifier of the parent snapshot. The parent snapshot is converted to read-only, and writes to the child snapshot are performed in regions of virtual disk 106 assigned to the child snapshot. Tracking inheritance among read-only and writable snapshots is described in a co-pending non-provisional application entitled "High-Performance Writable Snapshots in Data Storage Systems," having Ser. No. 15/639,757, filed 30 Jun. 2017, which is hereby incorporated by reference.

In one or more embodiments, the system may include more or fewer components than the components illustrated in FIG. 1. For example, storage management system 102 may include, execute with, or execute within a logical volume manager, filesystem manager, and/or other components for virtualizing storage or snapshotting data. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. For example, the data repository may include virtual disk 106 and/or physical storage 104. Further, the data repository may include multiple different storage units and/or devices. The multiple different storage units and/or devices may or may not be of the same type or located at the same physical site. The data repository may be implemented or may execute on the same computing system as storage management system 102 or on a computing system that is separate from storage management system 102. The data repository may be communicatively coupled to storage management system 102 via a direct connection or via a network.

Information describing storage management system 102 may be implemented across any of components within the system. However, this information is illustrated within the data repository 104 for purposes of clarity and explanation.

In one or more embodiments, storage management system 102 refers to hardware and/or software configured to perform operations described herein for managing high-performance writable snapshots. Examples of such operations are described below.

In an embodiment, storage management system 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Efficient Space Management for High Performance Writable Snapshots

In one or more embodiments, storage management system 102 includes functionality to improve performance and/or space management related to storing and managing read-only snapshots 108 and writable snapshots 110 on virtual disk 106. As shown in FIG. 1, virtual disk 106 includes a number of allocation unit (AU) chunks (e.g., AU chunk 1 112, AU chunk n 114). For example, the AU chunks may be organized into contiguous regions on virtual disk 106. Each AU chunk may be assigned a unique identifier, such as a chunk number that monotonically increases as new AU chunks are allocated.

Each AU chunk stores data from the snapshots in a set of contiguous, fixed-size AUs and manages ownership of the data by the snapshots in a series of contiguous AU mappings and free block bitmaps (FBBMs). AU chunk 1 112 includes AU mappings 116 and an FBBM 128 that track ownership of one set of AUs (e.g., AU 1 120, AU x 122) by one or more read-only snapshots 108 and/or writable snapshots 110, and AU chunk n 114 includes separate AU mappings 118 and an FBBM 130 that track ownership of another set of AUs (e.g., AU 1 124, AU y 126) by the same or different snapshots.

In one or more embodiments, each AU mapping stores information related to ownership and/or use of a corresponding AU in the same AU chunk. For example, each AU mapping occupies 32 bits and includes the following fields:
- 16 bits storing a snapshot identifier of a snapshot owning the AU. If the AU has not been assigned or is no longer assigned to a snapshot, a reserved value that indicates that the AU is free (e.g., a number that is lower than the minimum possible snapshot identifier or higher than the maximum possible snapshot identifier) is stored here.
- One bit indicating whether or not the AU is used to store a free block list (FBL) of original blocks from older snapshots that have been copied to a child snapshot of the older snapshots
- One bit indicating whether or not a FBBM for the AU is valid
- 8 or more bits storing a reference count representing the number of blocks in the AU that are allocated or in use As mentioned above, a bit in each AU mapping specifies whether or not the corresponding AU is used to store an FBL of original blocks from older snapshots that have been copied to a child snapshot of the older snapshots. More specifically, storage management system 102 designates individual AUs for use in storing FBLs for individual snapshots, where each AU stores an FBL for at most one snapshot. For example, storage management system 102 uses AU mappings 116-118 to identify a free AU and assigns the AU to a newly created snapshot (e.g., by storing the snapshot identifier of the snapshot in the first 16 bits of the AU mapping). Storage management system 102 also sets a bit in the AU mapping to indicate that the AU is used to store a FBL containing blocks that have been copied from older snapshots to the newly created snapshot. Storage management system 102 additionally initializes the AU by storing a null or 0 value in all entries of the AU, thereby indicating that the AU currently lacks valid block numbers. Storage management system 102 then uses the AU to store block numbers of the copied blocks and frees the blocks during deletion of snapshots to which the blocks are allocated, as described in further detail below.

In one or more embodiments, FBBMs 128-130 track allocated and freed blocks in AUs within the same AU chunk. For example, individual bits in FBBMs 128-130 represent individual blocks in the same AU chunk, with the position of each bit mapping to a corresponding block in the AU chunk. The bit may be set to 1 to indicate that the block is free and set to 0 to indicate that the block is allocated for use by a corresponding snapshot.

The fixed-size, contiguous, and repeating layout of AU mappings, FBBMs, AUs, and AU chunks in virtual disk 106 allow relationships among the AU mappings, FBBMs, and/or AUs to be established in constant time, independently of the size of virtual disk 106. For example, each data block in virtual disk 106 is identified by a unique block number. Within a given AU, blocks are ordered by monotonically increasing block number within a given AU, and AUs in a given AU chunk are ordered by monotonically increasing AU number. Moreover, all block numbers in an AU with a given AU number and/or an AU chunk with a given AU chunk number are higher than all block numbers in AUs with lower AU numbers and/or AU chunks with lower AU chunk numbers. The block number is divided by the number of blocks in an AU to produce an AU number that identifies the AU in which the block resides. The AU number is then divided by the number of AUs in the same AU chunk to produce an AU chunk number that identifies the AU chunk. The AU's position within the AU chunk is calculated as the AU number modulo the number of AUs in the AU chunk. An index to an AU mapping for the AU is calculated by dividing the AU number by the number of AU mappings. Finally, the block number of the AU mapping is obtained by adding the index to a product of the AU chunk number and the AU chunk size.

In general, the AU chunks are of fixed size to expedite access to specific AUs and/or AU mappings within the AU chunks (e.g., using the calculations described above). Conversely, one or more AU chunks (e.g., the last AU chunk in virtual disk 106) can optionally vary in size to accommodate space constraints on virtual disk 106.

In one or more embodiments, storage management system 102 uses AU mappings 116-118 and FBBMs 128-130 to track and/or manage the allocation of AUs and/or blocks in the AUs to read-only snapshots 108 and writable snapshots 110, writes to the AUs and/or blocks by the snapshots, and/or deletions of blocks and/or snapshots on virtual disk 106. To allocate an AU to a writable snapshot, storage management system 102 uses AU mappings 116-118 to identify a free AU and updates the AU mapping for the AU to store a snapshot identifier of the writable snapshot in lieu of a reserved value that previously indicated that the AU was free. Storage management system 102 also initializes the reference count in the AU mapping to 0 and creates an in-memory bitmap of the AU, with each bit in the bitmap representing a different block in the AU. The bit is set to one value (e.g., 0) to indicate that the corresponding block is free and to another value (e.g., 1) to indicate that the corresponding block has been allocated.

To speed up queries related to ownership of AUs by the snapshots, storage management system 102 optionally uses an in-memory "AU index" data structure to store mappings of snapshot identifiers for the snapshots to AUs allocated to the snapshots. For example, the AU index structure includes a two-dimensional (2D) sparse bitmap that is built from AU mappings 116-118 in one or more AU chunks. A first dimension of the 2D bitmap (e.g., rows) represents snapshots on virtual disk 106, and a second dimension of the 2D bitmap (e.g., columns) represents AU numbers of AUs on virtual disk 106.

In the AU index bitmap, a given bit is set to indicate that the corresponding AU is allocated to the corresponding snapshot and reset otherwise. As a result, the AU index allows storage management system 102 to quickly retrieve a list of AUs allocated to a given snapshot.

To allocate a free block to a writable snapshot, storage management system 102 uses AU mappings 116-118 and/or the AU index to identify an AU assigned to the writable snapshot. Next, storage management system 102 uses an in-memory bitmap of the AU to identify a free block in the AU. Storage management system 102 then allocates the free block to the snapshot by incrementing the reference count in the AU mapping for the AU and setting the corresponding bit in the in-memory bitmap of the AU.

During a write to a block by a writable snapshot, storage management system 102 uses the constant-time formulas described above to identify an AU containing the block and retrieve an AU mapping for the AU. For example, storage management system 102 may map a write to a portion of a file in a writable snapshot to one or more block numbers of blocks storing the portion in virtual disk 106. Because data blocks in all AUs are numbered in sequential, monotonically increasing order, each block number can be used to identify the AU chunk and AU containing the corresponding block based on the range of block numbers encompassed by the AU chunk and AU. Storage management system 102 retrieves the snapshot identifier stored in the AU mapping for the AU and compares the retrieved snapshot identifier to the snapshot identifier of the snapshot performing the write. If the snapshot identifiers are equal, the snapshot performs the write to the block.

If the snapshot identifiers are not equal, a copy-on-write (COW) operation is required to copy the data in the block to a free block that is owned by the writable snapshot before the write is performed. For example, storage management system 102 uses AU mappings 116-118, FBBMs 128-130, and/or the in-memory bitmap of free and allocated blocks to identify the free block in an AU owned by the writable snapshot. Storage management system 102 then performs the COW operation to copy data from the block to the free block, thereby allowing the write operation to be applied to the copied data.

After a COW operation is performed, the block number of the original block is added to the FBL for the snapshot performing the write operation. For example, the block number may be appended to a list that is stored in an AU with a corresponding AU mapping that includes the snapshot identifier of the snapshot and a bit set that indicates that the AU is used to store a FBL. In turn, the inclusion of the block number in the list indicates that the original block has been replaced by a new block owned by the snapshot.

Similarly, during deletion of a block by a writable snapshot, storage management system 102 uses the constant-time formulas described above to identify an AU containing the block and retrieve an AU mapping for the AU. Storage management system 102 retrieves the snapshot identifier stored in the AU mapping and compares the retrieved snapshot identifier to the snapshot identifier of the snapshot performing the deletion of the block. If the snapshot identifiers are equal and/or if the snapshot identifier in the AU mapping represents a writable snapshot, the block is deleted by decrementing the reference count in the AU mapping and clearing the corresponding bit in the in-memory bitmap of the AU. If the snapshot identifiers are not equal and/or if the snapshot identifier in the AU mapping represents a read-only snapshot, the block number of the block is added to the FBL for the snapshot performing the deletion.

In one or more embodiments, storage management system 102 allows deletion of all snapshots that are not branch points (i.e., snapshots that have only one child) in the inheritance tree. During deletion of a snapshot, blocks in the snapshot that are no longer referenced by a child snapshot of the snapshot are reclaimed. For example, blocks from a deleted snapshot may be reclaimed or freed if the blocks have been COWed to the child snapshot and/or deleted in the child snapshot.

To reclaim or free blocks in a deleted snapshot, storage management system 102 uses AU mappings 116-118 to identify and locate one or more AUs storing the FBL of the child snapshot of the deleted snapshot. When the child snapshot is a writable snapshot, AU mappings 116-118 are updated to transfer all AUs in the deleted snapshot to the child snapshot. Such transferring of AUs from the deleted snapshot to the child snapshot avoids additional COW and/or block deletion operations that result in the addition of new entries to the FBL for the child snapshot during reclamation of blocks in the deleted snapshot. After the AUs are transferred, the constant-time formulas and/or the AU index described above are used to match each block number in the FBL of the child snapshot to a corresponding snapshot identifier of a snapshot to which the corresponding block is allocated. When the snapshot identifier is equal to the snapshot identifier of the child snapshot, the reference count of the corresponding AU is decremented, and the in-memory bitmap of the AU is updated to clear the bit associated with the block number. When the reference count of the AU reaches 0, the snapshot identifier of the corresponding AU mapping is replaced with a reserved value indicating that the AU is free. After the block is freed, the block number of the block in the FBL is replaced with a 0, null, or other value indicating a lack of a valid block number in the corresponding entry of the FBL.

When the child snapshot is a read-only snapshot, the FBL of the child snapshot will not change during freeing of blocks in the deleted snapshot. As a result, the constant-time formulas and/or the AU index described above are used to match each block number in the FBL of the child snapshot to a corresponding snapshot identifier of a snapshot to which the corresponding block is allocated. When the snapshot identifier is equal to the snapshot identifier of the child snapshot or the snapshot identifier of the deleted snapshot, the reference count of the corresponding AU is decremented, and the in-memory bitmap of the AU is updated to clear the bit associated with the block number. When the reference count of the AU reaches 0, the snapshot identifier of the corresponding AU mapping is replaced with a reserved value indicating that the AU is free. After the block is freed, the block number of the block in the FBL is replaced with a 0, null, or other value indicating a lack of a valid block number in the corresponding entry of the FBL. Finally, after all block numbers in the FBL have been processed to free blocks in the deleted snapshot, remaining AUs owned by the deleted snapshot are transferred to the child snapshot (e.g., by updating the corresponding AU mappings).

In one or more embodiments, FBBMs 128-130 are updated to track free blocks in the AUs on an "optional" or "asymmetrical" basis. In these embodiments, optional updating of FBBMs 128-130 includes periodic and/or delayed synchronization of FBBMs 128-130 with the corresponding in-memory bitmaps of freed and allocated blocks, and asymmetrical updating of FBBMs 128-130 includes updating FBBMs 128-130 so that FBBMs 128-130 definitively identify blocks that are free without definitively identifying blocks that are allocated. For example, storage management system 102 synchronizes an FBBM of an AU that was owned by a deleted snapshot with the in-memory bitmap of freed and allocated blocks in the AU after blocks in the deleted snapshot have been freed. In another example, storage management system 102 periodically updates an FBBM of an AU that is owned by a writable snapshot to reflect the deletion of blocks in the writable snapshot. In both examples, the FBBM may indicate that some blocks are allocated when the blocks have already been freed (e.g., before the FBBM is updated to reflect freeing of the blocks).

In one or more embodiments, an FBBM for an AU is initialized during a first block freeing operation in the AU (e.g., during deletion of a snapshot to which the AU is allocated and/or deletion of a block in the AU). To initialize the FBBM, all bits in the FBBM are set to 0 to indicate that all blocks in the AU are in use, and an AU mapping for the AU is updated to include a bit that is set to indicate that the FBBM for the AU is valid. After the FBBM is initialized, freeing of a block after deletion of the block and/or deletion of a snapshot to which the block is allocated is propagated to the FBBM from the in-memory bitmap of the AU containing the block (e.g., on a periodic basis and/or after all blocks in the deleted snapshot that have been copied to child snapshots have been freed). Because multiple block freeing operations can be combined into a single update to the FBBM, disk I/O is reduced over techniques that constantly update on-disk representations of freed and allocated blocks.

In turn, FBBMs 128-130 can be used to optimize workloads related to replicating newly allocated blocks from one machine to another. For example, an FBBM that provides a list of freed blocks in an AU can be used to generate a second corresponding list of blocks that are allocated or free. In turn, the second list can be used to replicate the blocks between a source in which the blocks are stored and a target that is synchronized with the source.

When an outage and/or failure cause a loss of the in-memory bitmap that tracks freed and allocated blocks in AUs that have been allocated to snapshots, allocation of additional blocks in each of the AUs may be omitted until all blocks in the AU have been freed (as tracked by the reference count for the AU), which results in freeing of the entire AU. On the other hand, FBBMs 128-130 may continue to be used to generate lists of freed blocks in the AUs after the loss of the in-memory bitmap because FBBMs 128-130 track only blocks that are definitively free and can tolerate the loss of information regarding subsequently freed blocks.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 2:
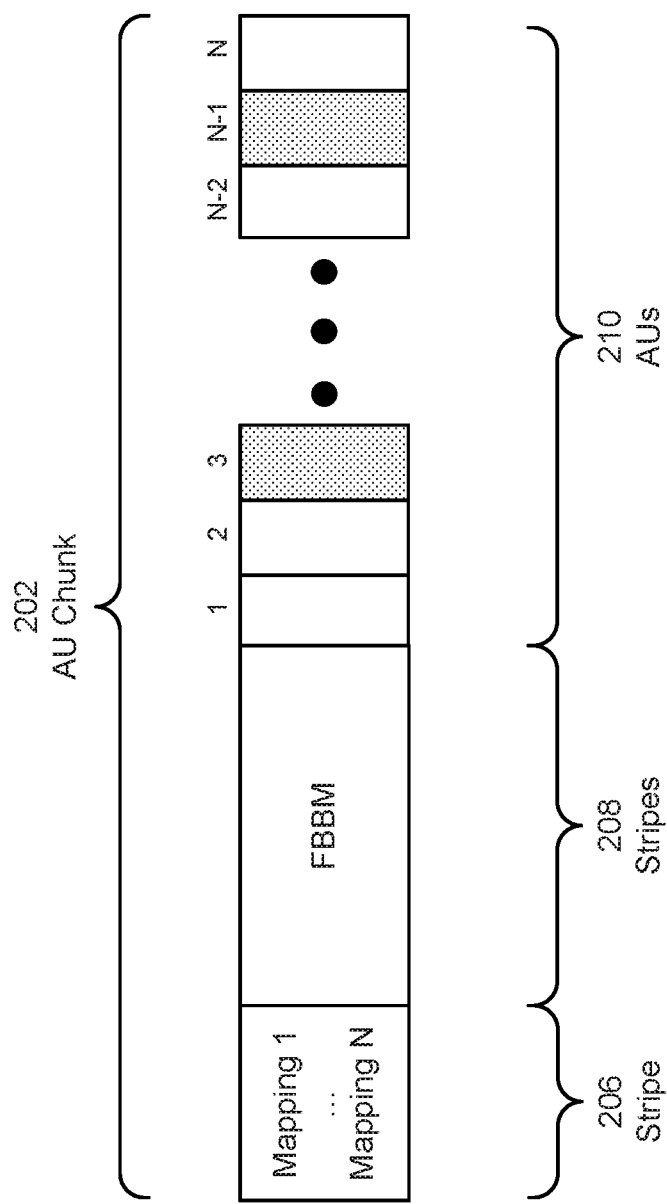
FIG. 2 illustrates an exemplary AU chunk in a storage management system in accordance with one or more embodiments.

FIG. 2 illustrates an exemplary AU chunk 202 in a storage management system (e.g., storage management system 102 of FIG. 1) in accordance with one or more embodiments. As shown in FIG. 2, AU chunk 202 starts with a stripe 206 containing AU mappings for a set of AUs 210 numbered 1 to N. Next to stripe 206, AU chunk 202 includes a number of stripes 208 containing an FBBM that tracks the allocation and freeing of individual blocks in AUs 210. The remainder of AU chunk 202 includes AUs 210 that can be allocated to snapshots, which can include older read-only snapshots 108 and newer writable snapshots 110 that are child snapshots of the read-only snapshots.

For example, the size of each AU is set to one stripe that encompasses 640 KB of data in physical storage 104. Each AU is divided into 160 contiguous data blocks of 4 KB each. One 640 KB stripe 206 is also allocated to store AU mappings for AUs 210 in AU chunk 202. Using the same block size of 4 KB, stripe 206 contains 160 "AU mapping blocks," and each AU mapping block stores 1024 32-bit AU mappings. Because each AU mapping stores metadata related to ownership and use of an individual AU, a single stripe of AU mappings can be used to manage 1024 AU mappings*160 AU mapping blocks*160 data blocks in each AU*4 KB in each data block, or around 100 GB of data divided into around 160,000 AUs 210.

Continuing with the above example, each bit in the FBBM represents an individual data block in the same AU chunk. One 4 KB FBBM block represents 32*1024 data blocks, or 204 stripes, in AUs within the same AU chunk. In turn, a FBBM stripe containing 160 FBBM blocks can cover 204*160 stripes, or around 19.92 GB of data. Thus, six FBBM stripes 208 are used to track allocated and freed blocks in 100 GB of data that is divided into around 160,000 AUs in the AU chunk.

Moreover, AU mappings in stripe 206 identify a subset of AUs 210 (e.g., AUs 210 3 and N-1) as storing FBLs of snapshots. For example, the third AU mapping and the next to last AU mapping in stripe 206 include bits set that indicate that the corresponding AUs are used to store lists of block numbers in older snapshots that have been copied to blocks owned by child snapshots of the older snapshots. The third AU mapping and the next to last AU mapping additionally store snapshot identifiers of the child snapshots.

In one or more embodiments, alignment of data in the AU mappings, FBBM, and AUs along stripe boundaries in physical storage reduces random input/output (I/O) and/or overhead associated with reading and/or writing striped data on hard disk drives (HDDs), solid-state drives (SSDs), and/or other types of physical storage. More specifically, the layout illustrated in FIG. 2 reduces seek time and increases I/Os per second (IOPS) by allowing reads and/or writes of the AU mappings, FBBM, and/or AUs to be performed sequentially and/or periodically. The compact storage of data in the AU mappings also allows the AU mappings to be stored in memory, which further reduces IOPS to disk and allows writes to be combined and/or made to much faster cache memory. Alignment of the AU mappings, FBBM, and AUs with stripes in a RAID6 configuration additionally reduces the frequency of a read-modify-write operation that is performed whenever data in a stripe is modified (e.g., by reducing the number of stripes affected by a modification to a given AU mapping, FBBM, and/or AU). Consequently, the storage management system provides improved performance and throughput over conventional storage management designs that require large amounts of I/O and/or random I/O to maintain metadata that tracks usage of storage by snapshots.

5. Storing Snapshots in a Storage Management System

Figure 3:
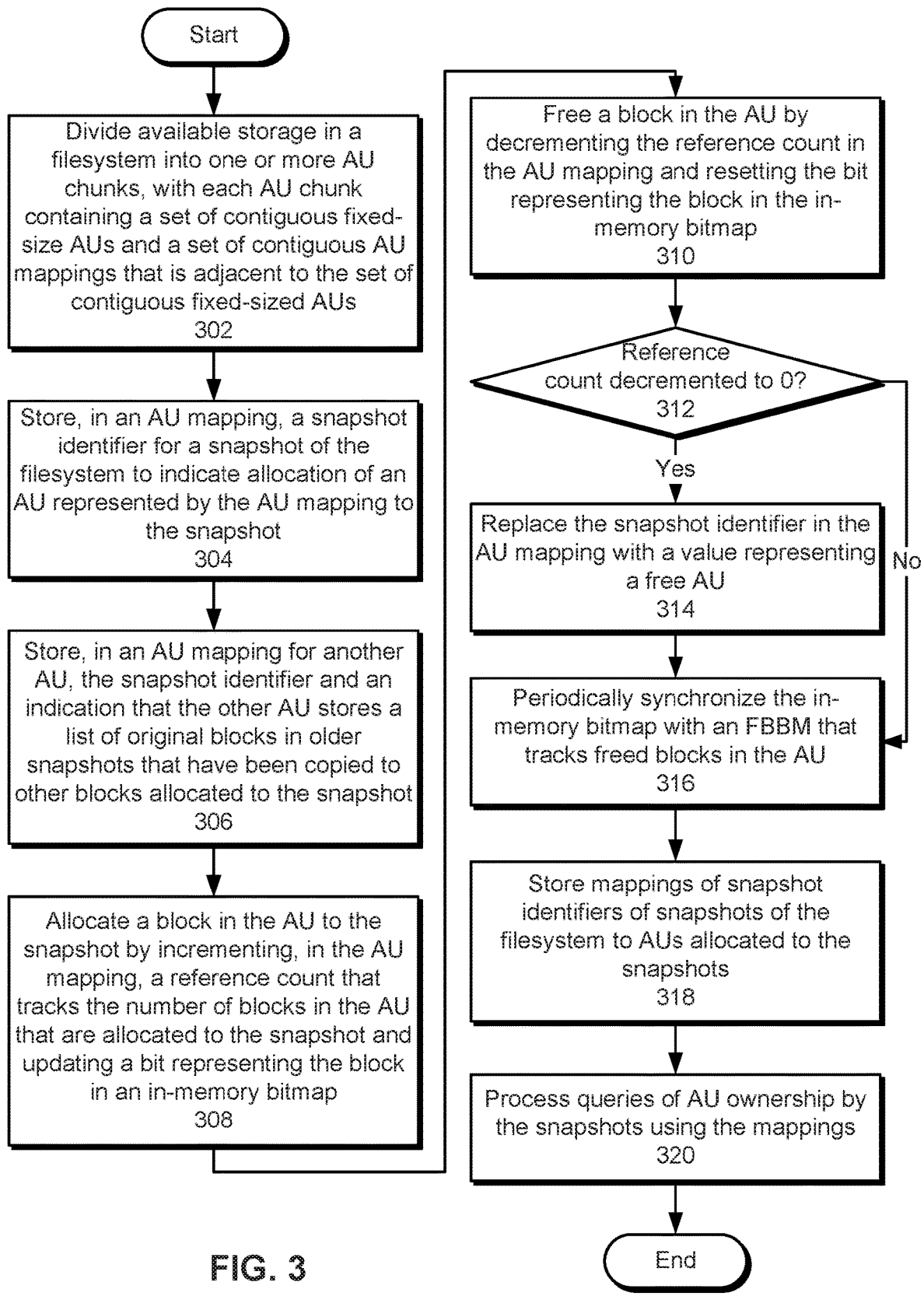
FIG. 3 illustrates a flowchart of storing a set of snapshots in a storage management system in accordance with one or more embodiments.

FIG. 3 illustrates a flowchart of storing a set of snapshots in a storage management system in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, available storage in a filesystem is divided into one or more AU chunks, with each AU chunk containing a set of contiguous fixed-size AUs and a set of contiguous AU mappings that is adjacent to the set of contiguous fixed-size AUs (operation 302). Each fixed-size AU may include a series of contiguous data blocks, and each AU mapping may store metadata for a different AU in the same AU chunk. For example, the position of a given AU mapping may be linearly related to the identifier and/or position of the corresponding AU in the same AU chunk. In addition, the size of the contiguous AU mappings and/or each AU may be a multiple of a stripe size associated with the filesystem to reduce random I/O and/or read-modify-write operations in the underlying storage.

Next, a snapshot identifier for a snapshot of the filesystem is stored in an AU mapping to indicate allocation of an AU represented by the AU mapping to the snapshot (operation 304). For example, the AU may be allocated to the snapshot by replacing, in the AU mapping, a value indicating a free AU with a snapshot identifier for the snapshot. A reference count in the AU mapping may additionally be initialized to 0 to indicate that no blocks in the AU have been allocated to the snapshot.

The snapshot identifier and an indication that another AU stores a list of original blocks in older snapshots that have been copied to other blocks allocated to the snapshot are also stored in an AU mapping for the other AU (operation 306). For example, the indication may include a bit that represents use of the other AU in storing an FBL for the snapshot. The other AU may subsequently be updated with block numbers of blocks from older read-only snapshots that have been modified and/or deleted in the snapshot, as described in further detail below with respect to FIG. 4.

A block in the AU is allocated by incrementing, in the AU mapping, the reference count that tracks the number of blocks in the AU that are allocated to the snapshot and updating a bit representing the block in an in-memory bitmap (operation 308). For example, the block may be allocated to the snapshot to allow subsequent writing and/or storing of data in the snapshot in the block.

Conversely, a block in the AU is freed by decrementing the reference count in the AU mapping and resetting the bit representing the block in the in-memory bitmap (operation 310). For example, the block may be freed after the block is deleted by the snapshot and/or during deletion of the snapshot.

The reference count in the AU may be decremented to 0 (operation 312) after all blocks in the AU have been freed. While the reference count remains positive, the AU continues to be allocated to the snapshot, and blocks in the AU can be allocated and freed. When the reference count is decremented to 0, all blocks in the AU have been freed, and the snapshot identifier in the AU mapping is replaced with a value representing a free AU (operation 314) to free the AU.

The in-memory bitmap is also periodically synchronized with an FBBM that tracks freed blocks in the AU (operation 316). For example, the FBBM of the AU may be initialized to contain values indicating allocation of all blocks in the AU during a first block freeing operation after the AU is allocated to the snapshot. The FBBM may then be updated on an "optional" and/or "asymmetrical" basis, in which the FBBM is updated to identify blocks in the AU that have been freed since the FBBM was initialized.

Finally, mappings of snapshot identifiers of snapshots of the filesystem to AUs allocated to the snapshots are additionally stored (operation 318), and queries of AU ownership by the snapshots are processed using the mappings (operation 320). For example, the mappings may be stored in an in-memory "AU index" that includes a 2D bitmap. A bit in the bitmap may be set to one value to indicate ownership of an AU represented by one dimension associated with the bit by a snapshot represented by the other dimension associated with the bit. The bit may be set to a different value to indicate lack of ownership of the AU by the snapshot. In turn, the bitmap may be used to quickly identify a set of AUs allocated to a given snapshot.

6. Executing Writes to a Snapshotted Data Set

Figure 4:
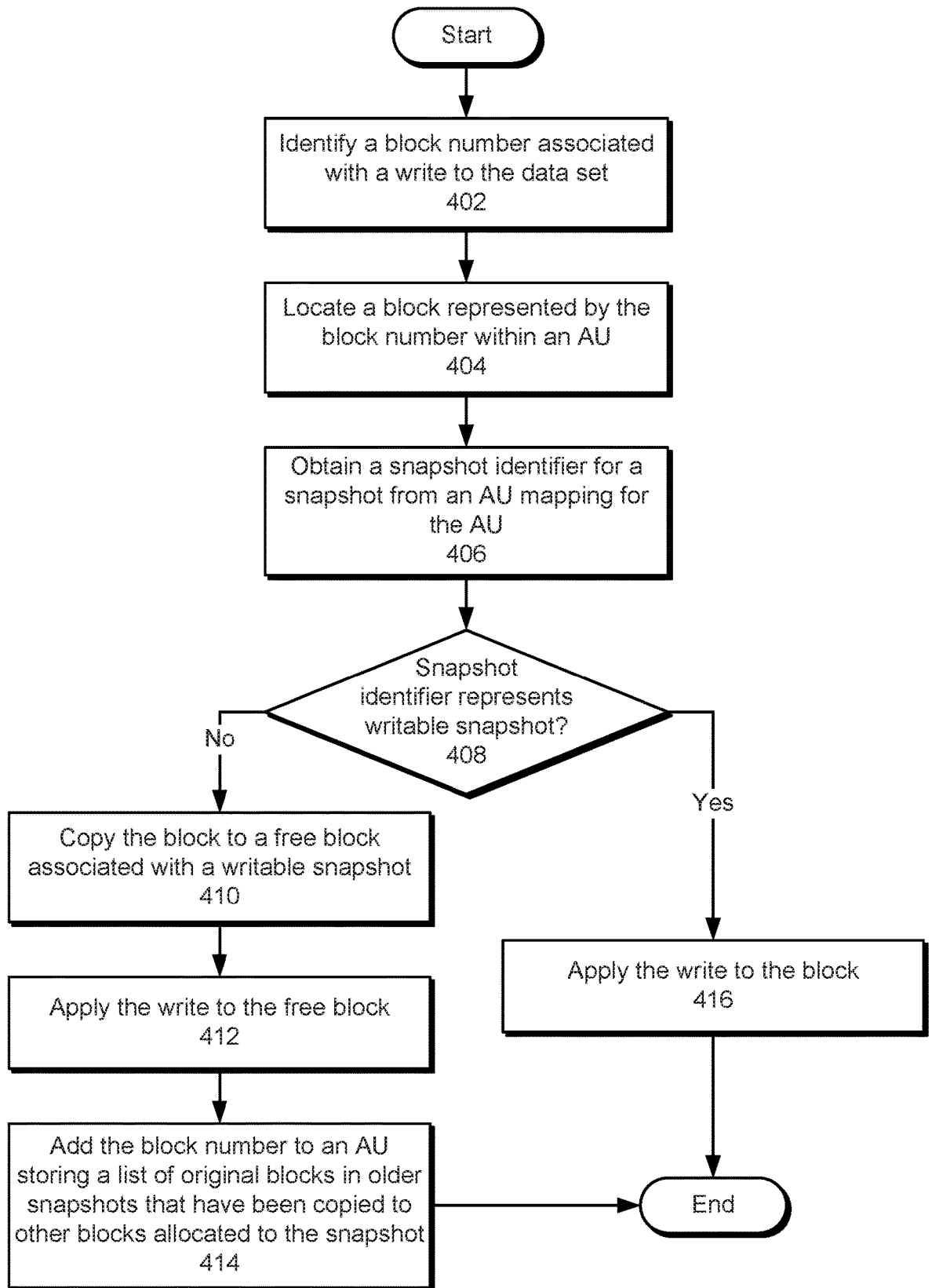
FIG. 4 illustrates a flowchart of executing writes to a snapshotted data set in accordance with one or more embodiments.

FIG. 4 illustrates a flowchart of executing writes to a snapshotted data set in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a block number associated with a write to the data set is identified (operation 402). For example, the block number may be identified using a mapping from a portion of the data set to which the write pertains to the block number of the block storing the portion. Next, a block represented by the block number is located within an AU (operation 404). For example, the block number may be matched to a range of block numbers spanned by the AU and/or divided by the number of blocks in each AU to obtain an AU number for the AU. An AU mapping for the AU is then used to obtain a snapshot identifier for a snapshot (operation 406). For example, the snapshot identifier may be obtained from an AU mapping at an offset representing the AU in the AU chunk containing the AU.

The snapshot identifier may represent a writable snapshot (operation 408). For example, the snapshot may be writable when the snapshot identifier belongs to the latest snapshot in a chain of inheritance from the earliest snapshot of the data set. If the snapshot identifier belongs to a snapshot that is a parent of the latest snapshot, the snapshot may be read-only. If the snapshot identifier belongs to a writable snapshot, the write is applied to the block (operation 416).

If the snapshot identifier does not belong to a writable snapshot, the block is copied to a free block associated with a writable snapshot (operation 410). For example, the block may be copied from an AU owned by a read-only snapshot to a free block in an AU belonging to the writable snapshot. The write is then applied to the free block (operation 412). In addition, the block number is added to an AU storing a list of original blocks in older snapshots that have been copied to other blocks allocated to the snapshot (operation 414). The list may subsequently be used to free the block during deletion of the read-only snapshot, as described in further detail below with respect to FIG. 5.

7. Deleting Snapshots in a Storage Management System

Figure 5:
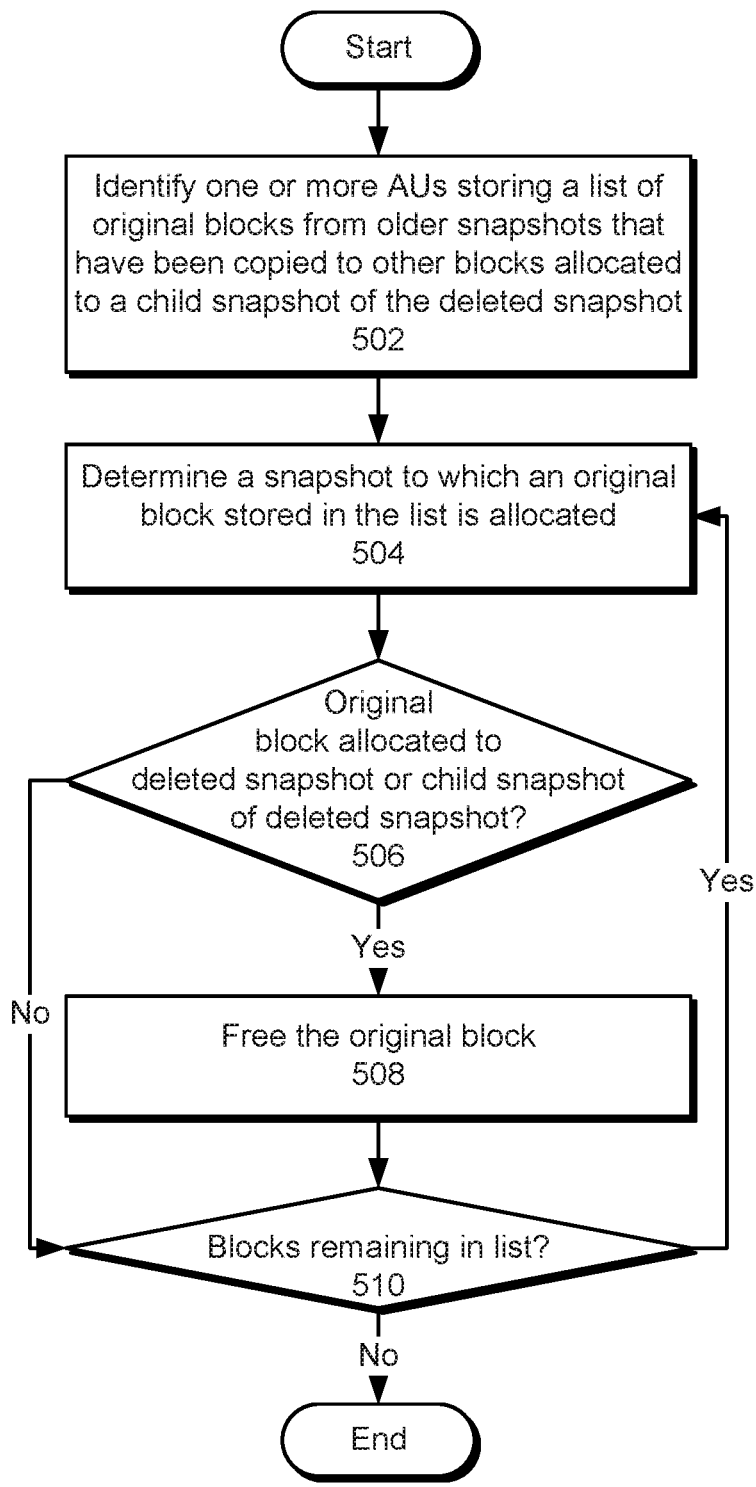
FIG. 5 illustrates a flowchart of deleting a snapshot in a storage management system in accordance with one or more embodiments.

FIG. 5 illustrates a flowchart of deleting a snapshot in a storage management system in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, one or more AUs storing a list of original blocks from older snapshots that have been copied to other blocks allocated to a child snapshot of the deleted snapshot are identified (operation 502). For example, the AUs may be identified based on corresponding AU mappings that contain the snapshot identifier of the child snapshot and a bit indicating that the AU stores an FBL.

Next, a snapshot to which an original block stored in the list is allocated is determined (operation 504). For example, the block number of the original block may be used to identify an AU number of the AU, and an AU mapping for the AU and/or an in-memory AU index may be used to identify the snapshot to which the AU and original block are allocated.

The original block is processed based on allocation of the original block to the deleted snapshot or the child snapshot of the deleted snapshot (operation 506). If the original block is allocated to either the deleted snapshot or the child snapshot, the original block is freed (operation 508) because the original block has been replaced with a different block in the child snapshot. If the original block is not allocated to the deleted snapshot or the child snapshot, the original block is not freed.

Operations 504-508 may be repeated for remaining blocks in the list (operation 510). For example, each block number in the list may be used to identify a snapshot to which the corresponding block is allocated, and the block is freed if the snapshot is the deleted snapshot or the child snapshot. The deletion operation is complete after AUs belonging to the deleted snapshot are transferred to the child snapshot, which can be performed before operation 504 or after operation 510.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
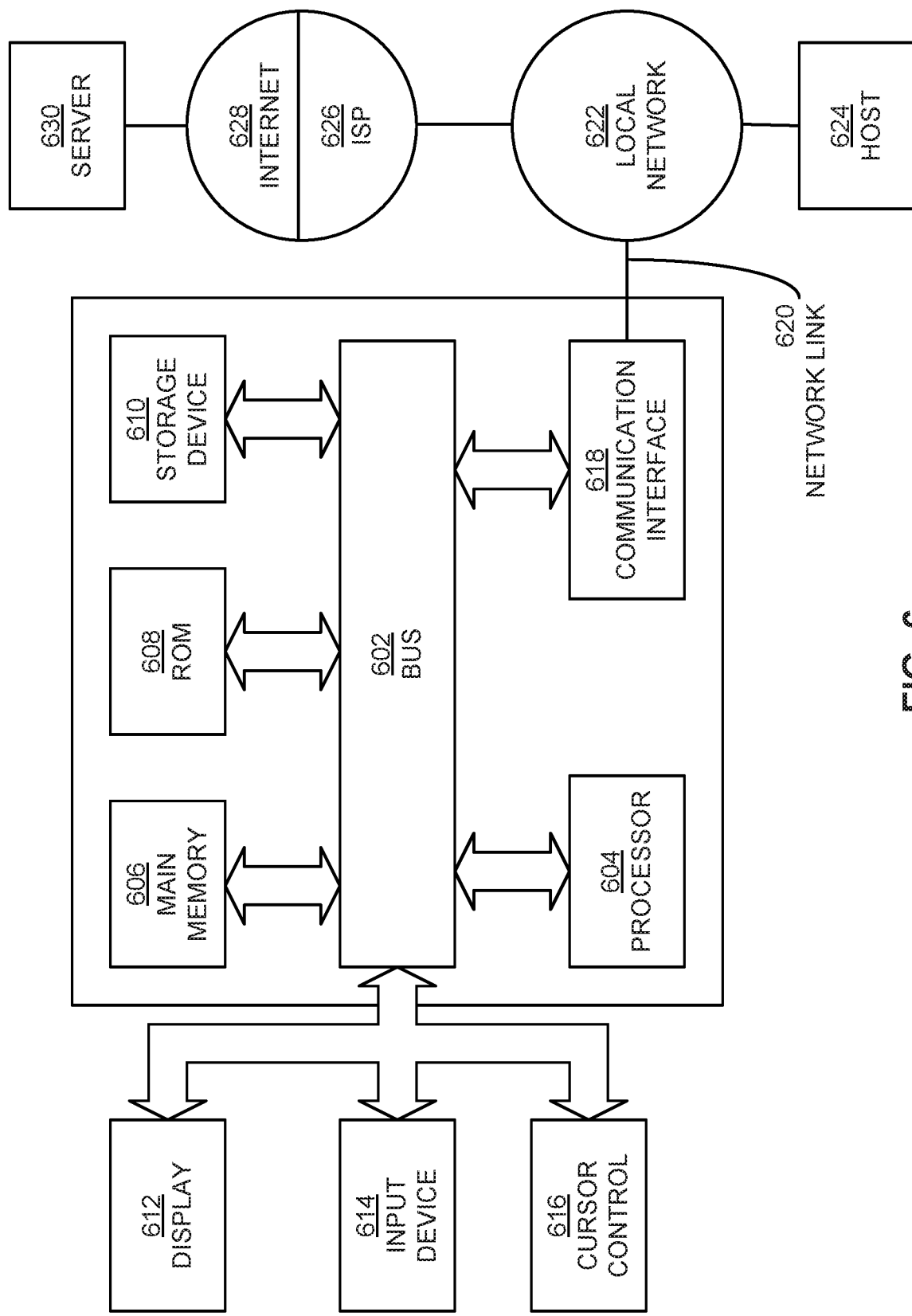
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   dividing available storage in a filesystem into one or more contiguous allocation unit (AU) chunks, wherein each of the AU chunks comprises:
      a set of contiguous fixed-size AUs, wherein each AU in the set of contiguous fixed-size AUs comprises a series of contiguous fixed-size blocks; and
      a set of contiguous AU mappings that is adjacent to the set of contiguous fixed-size AUs, wherein each AU mapping in the set of contiguous AU mappings represents a different AU in the set of contiguous fixed-size AUs;
   storing, in a first AU mapping in the set of contiguous AU mappings, a first snapshot identifier for a snapshot of the filesystem to indicate allocation of a first AU represented by the first AU mapping to the snapshot; and
   allocating a first block in the first AU to the snapshot by incrementing, in the first AU mapping, a reference count that tracks a number of blocks in the first AU that are allocated to the snapshot.

2. The medium of claim 1, wherein the operations further comprise:
   updating a bit representing the first block in an in-memory bitmap to track allocation of the block to the first AU; and
   freeing the first block by decrementing the reference count in the first AU mapping and resetting the bit representing the block in the in-memory bitmap.

3. The medium of claim 2, wherein the operations further comprise:
   periodically synchronizing the in-memory bitmap with a free block bitmap (FBBM) that tracks freed blocks in the first AU.

4. The medium of claim 3, wherein periodically synchronizing the in-memory bitmap with the FBBM comprises:
   during a first block freeing operation after allocation of the first AU to the snapshot, initializing, in the FBBM, a subset of bits representing blocks in the first AU to a value representing use of the blocks.

5. The medium of claim 3, wherein a size of the FBBM comprises a multiple of a stripe size associated with the filesystem.

6. The medium of claim 2, wherein the operations further comprise:
   when the reference count is decremented to 0, replacing the first snapshot identifier in the first AU mapping with a value representing a free AU.

7. The medium of claim 1, wherein the operations further comprise:
   during a write to a second block by the snapshot, obtaining a second snapshot identifier from a second AU mapping for a second AU containing the second block;
   when the second snapshot identifier does not match the first snapshot identifier, copying the second block to a free block in the first AU; and
   applying the write to the free block.

8. The medium of claim 7, wherein the operations further comprise:
   adding a block number of the second block to a third AU storing a list of original blocks in older snapshots that have been copied to other blocks allocated to the snapshot; and
   storing, in a third AU mapping for the third AU, an indication that the third AU stores the list of original blocks that have been copied to the other blocks allocated to the snapshot.

9. The medium of claim 8, wherein the operations further comprise:
   during deletion of an older snapshot that is a parent of the snapshot, freeing blocks owned by the older snapshot based on the list of original blocks in the third AU.

10. The medium of claim 9, wherein freeing the blocks owned by the older snapshot based on the list of original blocks in the third AU comprises:
    identifying the third AU storing the list of original blocks based on the other AU mapping; and
    for each original block in the list of original blocks, freeing the original block when the original block is owned by the older snapshot or a child snapshot of the older snapshot.

11. The medium of claim 1, wherein the operations further comprise:
    storing mappings of snapshot identifiers of snapshots of the filesystem to AUs allocated to the snapshots; and
    processing queries of AU ownership by the snapshots using the mappings.

12. The medium of claim 1, wherein the set of contiguous AU mappings occupy a multiple of a stripe size associated with the filesystem.

13. The medium of claim 1, wherein the set of snapshots comprises:
    a writable snapshot; and
    one or more read-only snapshots preceding the writable snapshot.

14. A method, comprising:
    dividing available storage in a filesystem into one or more contiguous allocation unit (AU) chunks, wherein each of the AU chunks comprises:
       a set of contiguous fixed-size AUs, wherein each AU in the set of contiguous fixed-size AUs comprises a series of contiguous fixed-size blocks; and
       a set of contiguous AU mappings that is adjacent to the set of contiguous fixed-size AUs, wherein each AU mapping in the set of contiguous AU mappings represents a different AU in the set of contiguous fixed-size AUs;
    storing, in a first AU mapping in the set of contiguous AU mappings, a first snapshot identifier for a snapshot of the filesystem to indicate allocation of a first AU represented by the first AU mapping to the snapshot; and
    allocating a first block in the first AU to the snapshot by incrementing, in the first AU mapping, a reference count that tracks a number of blocks in the first AU that are allocated to the snapshot.

15. The method of claim 14, further comprising:
updating a bit representing the first block in an in-memory bitmap to track allocation of the block to the first AU;
freeing the first block by decrementing the reference count in the first AU mapping and resetting the bit representing the block in the in-memory bitmap; and
periodically synchronizing the in-memory bitmap with a free block bitmap (FBBM) that tracks freed blocks in the first AU.

16. The method of claim 15, wherein sizes of the FBBM and each AU in the set of contiguous fixed-size AUs comprise multiples of a stripe size associated with the filesystem.

17. The method of claim 14, further comprising:
during a write to a second block by the snapshot, obtaining a second snapshot identifier from a second AU mapping for a second AU containing the second block;
when the second snapshot identifier does not match the first snapshot identifier, copying the second block to a free block in the first AU; and
applying the write to the free block.

18. The method of claim 17, further comprising:
adding a block number of the second block to a third AU storing a list of original blocks in older snapshots that have been copied to other blocks allocated to the snapshot; and
storing, in a third AU mapping for the third AU, an indication that the third AU stores the list of original blocks that have been copied to the other blocks allocated to the snapshot; and
during deletion of an older snapshot that is a parent of the snapshot, freeing blocks owned by the older snapshot based on the list of original blocks in the third AU.

19. The method of claim 18, wherein freeing the blocks owned by the older snapshot based on the list of original blocks in the third AU comprises:
identifying the third AU storing the list of original blocks based on the other AU mapping; and
for each original block in the list of original blocks, freeing the original block when the original block is owned by the older snapshot or a child snapshot of the older snapshot.

20. An apparatus, comprising:
one or more processors; and
memory storing instructions that, when executed by the one or more processors, cause the apparatus to:
divide available storage in a filesystem into one or more contiguous allocation unit (AU) chunks, wherein each of the AU chunks comprises:
a set of contiguous fixed-size AUs, wherein each AU in the set of contiguous fixed-size AUs comprises a series of contiguous fixed-size blocks; and
a set of contiguous AU mappings that is adjacent to the set of contiguous fixed-size AUs, wherein each AU mapping in the set of contiguous AU mappings represents a different AU in the set of contiguous fixed-size AUs;
store, in a first AU mapping in the set of contiguous AU mappings, a first snapshot identifier for a snapshot of the filesystem to indicate allocation of a first AU represented by the first AU mapping to the snapshot; and
allocate a first block in the first AU to the snapshot by incrementing, in the first AU mapping, a reference count that tracks a number of blocks in the first AU that are allocated to the snapshot.

* * * * *